UNITED STATES PATENT OFFICE.

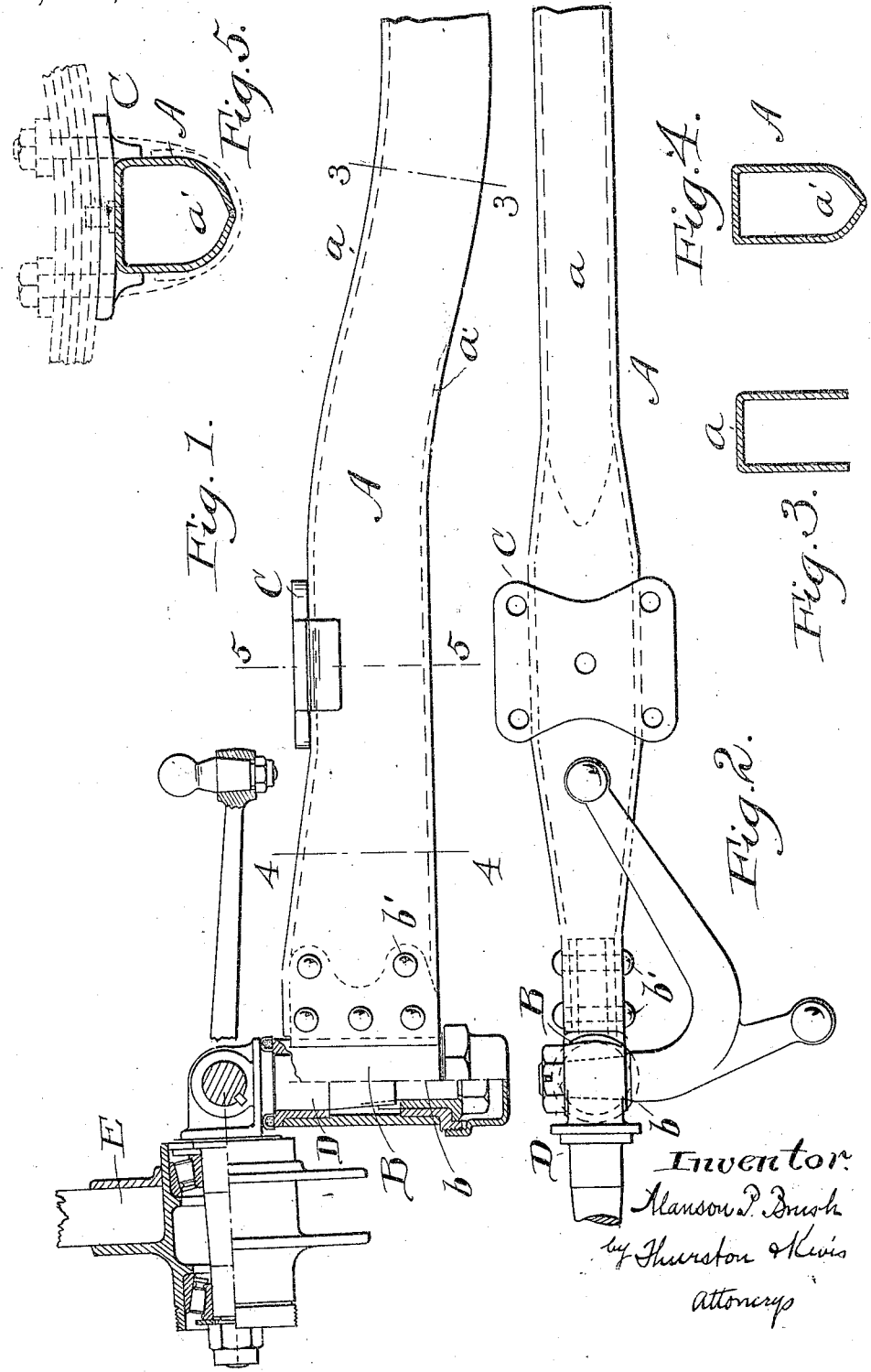

ALANSO' P. BRUSH, OF DETROIT, MICHIGAN.

FRONT AXLE FOR AUTOMOBILES.

1,200,305.  Specification of Letters Patent.  Patented Oct. 3, 1916.

Application filed January 21, 1916. Serial No. 73,293.

*To all whom it may concern:*

Be it known that I, ALANSON P. BRUSH, a citizen of the United States, residing at Detroit, in the county of Wayne and State of Michigan, have invented a certain new and useful Improvement in Front Axles for Automobiles, of which the following is a full, clear, and exact description.

The object of this invention is to provide a front axle for automobiles, in which the necessary capacity to withstand the strains of use, is secured by the employment of a relatively small amount of properly disposed metal; or in other words, to provide an extremely light weight axle which is sufficiently strong for practical purposes.

The invention consists in the construction and combination of parts shown in the accompanying drawings, and hereinafter described and definitely pointed out in the appended claims.

In the drawings, Figure 1 is a front elevation of one-half of a front axle in which the present invention is embodied; Fig. 2 is a plan view of so much of the axle as is shown in Fig. 1; Figs. 3, 4 and 5 are respectively vertical sections in the planes indicated by the lines 3—3, 4—4 and 5—5 on Fig. 1.

The axle body A is made from a single piece of sheet steel pressed into substantially the shape shown, that is to say, its middle part $a$ is a U-section which, when the axle is completed, will be inverted. The ends $a'$, $a'$, are tubular; which form is produced by drawing together and connecting as by welding the lower edges of the inverted U-shaped member. A spring seat C may be connected with said axle body near each end thereof as shown. All of the body outside of the spring seats, that is to say, adjacent the ends thereof, must be tubular; and this tubular construction extends inward beyond the spring seats as far as necessary to enable the lower edges to be conveniently brought together and welded to form the tubular end portions outside of the spring seats.

B represents the mounting for the steering knuckle D of a front wheel E. One of these knuckle mountings is provided at each end of the axle; and each of these mountings is formed with a shank $b$ which projects into the tubular end of the axle body, and is tightly fitted thereto, and is rigidly secured in and to the end portions of said body by rivets $b'$ or other suitable means.

The particular form of the knuckle mounting which carries the shank $b$ may be varied to whatever extent desired so long as it permits the knuckle to be suitably mounted thereon on a substantially vertical axis.

When a front axle is in use as part of an automobile, the parts thereof between the spring seats are subjected to vertical strains, and to some horizontal strains, which are, however, very much less than the vertical strains. The U-shaped section of the axle as shown is well calculated to resist these strains. The parts of the axle outside of the spring seats are not only subjected to these strains, but are also subjected to torsional strains. For this reason it is that these end parts of the axle body are made tubular. When so constructed they will be sufficiently strong to effectually resist these strains in practical use.

The particular construction shown in the drawing is, as will be evident, designed for use with longitudinally extended leaf springs which serve to connect the axle with the chassis frame. There is, however, a well known type of axle, such as is used on Ford automobiles, in which the connection between the axle is made by a semi-elliptical spring which is fastened at its middle to the chassis frame, and is fastened at its ends to the axle by means of suitable shackles. When this connection is employed there is also an adjunctive connection, namely, a forked strut rod. This is connected at its apex with the chassis frame, while its two arms are connected with the axle. When this form of connection between a front axle and a chassis frame is employed, the torsional strains incident to use continue along the axle to the points where this forked strut rod is attached. Therefore, in forming an axle which embodies this invention for use with the above referred to means for connecting the axle with the body, it is necessary to continue the tubular end portions of the axle body toward the center to or past the points at which the strut rod is connected with the axle.

Having described my invention, I claim:

1. A front axle for automobiles having a middle part of inverted U-section, and having tubular ends, and having steering knuckle mountings which are rigid with and located outside of said tubular ends.

2. A front axle for automobiles, having a middle part which is of inverted U-section, and having ends which are tubular and are made tubular by drawing into contact and uniting the lower edges of said inverted U-shaped body member, and steering knuckle mountings which are rigid with and located outside of said tubular ends.

3. A front axle for automobiles, having a middle part which is of inverted U-section, and having ends which are tubular and are made tubular by drawing into contact and uniting the lower edges of said inverted U-shaped body member, and steering knuckle mountings having shanks which are fitted into and are secured to said tubular ends of the axle body member.

In testimony whereof, I hereunto affix my signature in the presence of two witnesses.

ALANSON P. BRUSH.

Witnesses:
E. L. Thurston,
E. B. Gilchrist.